(12) United States Patent
Shiotsu

(10) Patent No.: US 8,317,335 B2
(45) Date of Patent: Nov. 27, 2012

(54) PROJECTION TYPE VIDEO DISPLAY HAVING ENHANCED STARTUP OPERATION

(75) Inventor: Shinichi Shiotsu, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 703 days.

(21) Appl. No.: 11/723,248

(22) Filed: Mar. 19, 2007

(65) Prior Publication Data

US 2007/0222952 A1    Sep. 27, 2007

(30) Foreign Application Priority Data

Mar. 23, 2006    (JP) ................................ 2006-080252

(51) Int. Cl.
G03B 21/16    (2006.01)
G03B 21/20    (2006.01)
(52) U.S. Cl. .......................................... 353/52; 353/85
(58) Field of Classification Search .................... 353/85, 353/52, 57, 58; 362/294; 250/205; 352/202
See application file for complete search history.

(56) References Cited

U.S. PATENT DOCUMENTS

| 4,283,658 | A | * | 8/1981 | Parker | 315/117 |
| 4,672,271 | A | * | 6/1987 | Gear et al. | 315/117 |
| 6,472,828 | B1 | * | 10/2002 | Pruett et al. | 315/225 |
| 7,040,762 | B2 | * | 5/2006 | Yasuda | 353/52 |
| 7,252,385 | B2 | * | 8/2007 | Engle et al. | 353/52 |
| 2004/0239887 | A1 | | 12/2004 | Yasuda | |
| 2005/0068505 | A1 | * | 3/2005 | Momose et al. | 353/97 |

FOREIGN PATENT DOCUMENTS

| EP | 1 638 342 A2 | 3/2006 |
| EP | 1638342 A2 | 3/2006 |
| JP | 04147291 A | 5/1992 |
| JP | 2004-18892 * | 6/2004 |
| JP | 2004-163686 A | 6/2004 |
| JP | 2004-178892 * | 6/2004 |
| JP | 2004-178892 A | 6/2004 |
| JP | 2004-348109 A | 12/2004 |
| WO | 2004/103032 A1 | 11/2004 |

OTHER PUBLICATIONS

Chinese Office Action dated Oct. 23, 2009 issued in corresponding Chinese Patent Application No. 200610063644.
Chinese Office Action dated Nov. 5, 2008, issued in corresponding Chinese Patent Application No. 200610063644.
Japanese Office Action dated Jun. 1, 2010, issued in corresponding Japanese Patent Application No. 2006-080252.
European Search Report for Application No. 07004271 mailed on Jun. 19, 2007.

* cited by examiner

*Primary Examiner* — Pascal M Bui Pho
(74) *Attorney, Agent, or Firm* — Westerman, Hattori, Daniels & Adrian, LLP

(57) ABSTRACT

A projection type video display for displaying a video by casting light that is emitted from a lamp (1) serving as a light source and modulated on the basis of a video signal, has lamp cooling means (3) for cooling the lamp 1. The video display comprises: detection means (lamp drive circuit 2) for detecting the startup status (lamp voltage information) of the lamp in a startup operation: and control means (microcomputer 4) for controlling the lamp cooling means (3) in accordance with the startup status detected by the detection means. This arrangement can shorten time required for the execution of the startup operation of the lamp.

3 Claims, 5 Drawing Sheets

PROJECTION TYPE VIDEO DISPLAY HAVING ENHANCED STARTUP OPERATION

FIELD OF THE INVENTION

This invention relates to a projection type video display such as a liquid crystal projector, and more particularly to a control unit for controlling the startup process of a lamp for use as a light source of such display.

BACKGROUND OF THE INVENTION

A projection type video display such as a liquid crystal projector has a display such as a liquid crystal panel adapted to modulate light emitted from a lamp, e.g. an ultra-high pressure mercury lamp serving as a light source, based on a video signal, and cast the modulated light to display a video associated with the video signal. This type of display is equipped with lamp cooling means for cooling the lamp.

In such a conventional projection type video display as mentioned above, the lamp cooling means is enabled immediately after power is applied to the lamp, thereby starting cooling (ordinary cooling) of the lamp immediately after the lamp is turned on or started up based on a presumed stationary operating condition of the lamp at high temperature.

There is disclosed in Japanese Patent Application Laid Open No. 24-348109 (G03B 21/16) a technique of determining the necessity of cooling of a lamp based on the lamp temperature and executing cooling if needed. This prior art projection type display, adapted to cast light to project a video by modulating the light emitted from a lamp, comprises: cooling means for cooling the lamp; time management means for managing time that elapses after said lamp is turned off; and control means for controllably turning on the lamp based on the output of the time management means after the lamp is sufficiently cooled by the cooling means if the temperature of the lamp to be turned on is higher than a predetermined temperature, but turning on the lamp without cooled it if its temperature is lower than the predetermined temperature. In other words, as is apparent from the preceding description and paragraphs 14, 39-43, 47-50, and FIGS. 5 and 7 of the cited reference, the prior art performs cooling of the lamp before the lamp is turned on if its temperature is high but otherwise performs cooling simultaneously with the turn-on of the lamp.

Thus, in the prior art, ordinary cooling of the lamp is always performed from the beginning of a startup operation of the lamp, which disadvantageously delays evaporation of mercury in the lamp, particularly when the lamp temperature is low, hence delaying the development of the startup process of the lamp.

SUMMARY OF THE INVENTION

It is, therefore, an object of the present invention to overcome the problem as stated above by providing a projection type video display capable of quickly executing the startup process of a lamp.

To this end, there is provided in accordance with one aspect of the invention a projection type video display for displaying a video by casting light that is emitted from a lamp serving as a light source and modulated on the basis of a video signal, the video display having lamp cooling means for cooling the lamp, the projection type video display characterized by comprising:

detection means for detecting the condition of the lamp in a startup operation (the condition hereinafter referred to as startup status); and control means for controlling the lamp cooling means in accordance with the startup status detected by the detection means.

In this projection type video display, the lamp cooling means is controlled in accordance with the startup status of the lamp, so that ordinary lamp cooling, i.e. cooling performed from the beginning of the startup operation, is avoided, thereby enabling quick execution of the startup operation of the lamp. Further, since the cooling is controlled based on the startup status of a particular lamp used, it is possible to deal with individual variations in the startup rate of lamps to be used. For example, in the event that cooling is started at a predetermined time after the initiation of a startup operation, if the lamp happens to have a large startup rate due to manufacturing variation, the lamp will have been done with the startup process by the time the cooling is started and has already exceeded its rated temperature, thereby resulting in degradation of its reliability. On the other hand, if the lamp happens to have a small startup rate due to manufacturing variation, mercury in the lamp will not have fully evaporated by the time the cooling is started. Moreover, the cooling of the lamp further delays the development of the startup process. It will be appreciated that the present invention can control the cooling means to provide optimal cooling to the particular lamp used.

To do this, the control means may be adapted to enable the lamp cooling means when the detection means has detected a parameter indicative of the startup status of the lamp reaching or exceeding a rated value.

In this arrangement, since the lamp cooling means is not enabled after the initiation of a startup operation until the parameter indicative of the lamp status has reached or exceeded a rated value, the temperature of the lamp can rise quickly in the startup process. This enhances evaporation of the mercury in the lamp and hence execution of the startup process.

The detection means may be adapted to detect the voltage applied to the lamp (lamp voltage).

It is noted that the startup status of the lamp can be reliably detected from the lamp voltage, since the voltage depends on the startup status of the lamp.

The detection means can be implemented as a lamp drive circuit capable of driving the lamp and outputting information on the lamp voltage (the information hereinafter referred to as lamp voltage information).

By effective use of such a lamp drive circuit as described above, the invention can fulfill the object described above at low cost.

The detection means can be alternatively implemented by a temperature sensor for detecting the ambient temperature in the neighborhood of the lamp.

Such sensor also enables reliable detection of the startup status of the lamp from the rising ambient temperature in the neighborhood of the lamp.

DETAILED DESCRIPTION OF THE PREFERRED EMBODIMENT

Figure 1:
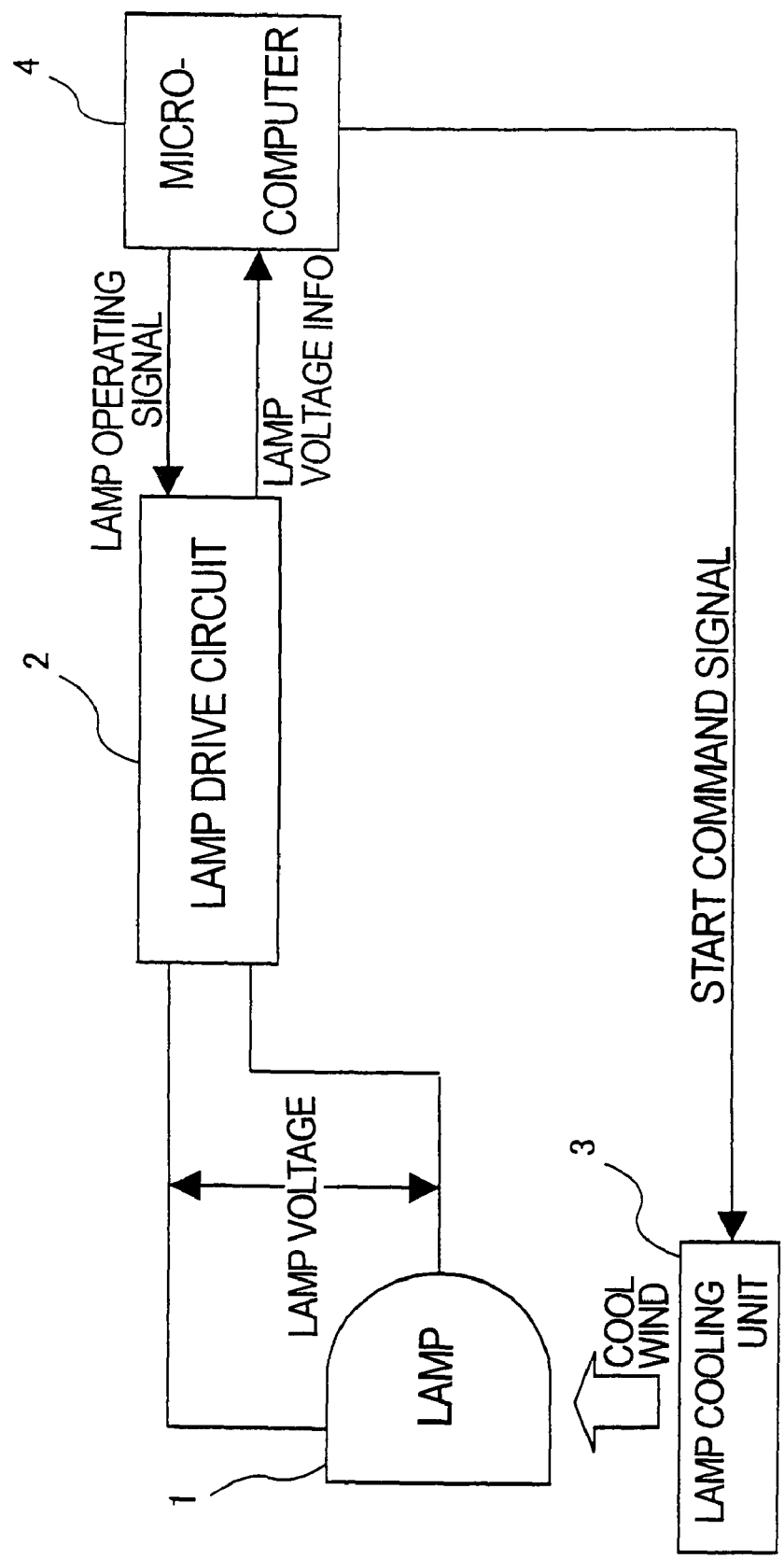
FIG. 1 is a block diagram showing an arrangement of a relevant part of a projection type video display such as a liquid crystal projector in accordance with one embodiment of the invention.

Referring to FIG. 1, there is shown in block diagram the arrangement of a relevant part of a projection type video display such as a liquid crystal projector in accordance with one embodiment of the invention.

As shown in FIG. 1, the video display includes a lamp 1 such as a ultra-high pressure mercury lamp serving as a light source, a lamp drive circuit 2 for driving the lamp 1, a lamp cooling unit 3 having a fan for cooling the lamp 1, and a microcomputer 4 for controlling the lamp drive circuit 2 and the lamp cooling unit 3.

The lamp drive circuit 2 is a so-called lamp ballast, which has a function of driving the lamp 1 and of outputting lamp voltage information on the voltage applied to the lamp 1. The microcomputer 4 serves as the control means of the invention, which is adapted to output a lamp operating signal to the lamp drive circuit 2 and output a start command signal to the lamp cooling unit 3 in response to, and based on, the lamp voltage information received from the lamp drive circuit 2.

Since the ultra-high pressure mercury lamp 1 used as a light source is initially turned on by a low voltage (in the range from 10 to 20 V for example), mercury in the lamp does not evaporate sufficiently in the initial stage of the lamp operating or startup operation. As the lamp temperature rises subsequently, mercury begins to evaporate, causing the lamp voltage to rise. This continues until the temperature finally reaches its rated voltage (80-100 V for example). Therefore, the startup status, i.e. condition of the lamp in the startup operation, can be reliably detected from the lamp voltage. Noting this point, this embodiment utilizes the lamp drive circuit (lamp ballast) 2 capable of providing lamp voltage information as the means for detecting the startup status of the lamp.

In the arrangement shown above, when the video display is powered on, a lamp operating signal for turning on the lamp 1 is outputted from the microcomputer 4 to the lamp drive circuit 2, thereby causing the lamp 1 to be turned on. At this point, the lamp cooling unit 3 still remains disabled to promote temperature rise of the lamp 1 and enhance evaporation of mercury therein. As the lamp 1 turns on, the microcomputer 4 starts monitoring the lamp voltage information received from the lamp drive circuit 2, and, when it is judged that the voltage of the lamp 1 has reached a rated level, outputs a start command signal to the lamp cooling unit 3 to thereby enable the lamp cooling unit 3.

Referring to the flowchart of FIG. 2, operation of the lamp cooling unit 3 will now be described in more detail. First, the projection type video display is powered on (Step S101) to boot up the microcomputer 4. The microcomputer 4 then outputs a lamp operating signal to the lamp drive circuit 2 to turn on the lamp 1 (Step S102). The microcomputer 4 monitors the lamp voltage (step S103) based on the lamp voltage information received from the lamp drive circuit 2, and checks (step S104) if the lamp voltage has reached the rated level (which is 40 V in the example shown herein).

The microcomputer 4 keeps on monitoring the lamp voltage without enabling the lamp cooling unit 3 (looping through Steps S104-S103 defined for the negative answer "N" in the query of Step S104) until the lamp voltage reaches 40 V. When the lamp voltage reaches or exceeds 40 V, the microcomputer 4 outputs a start command signal to the lamp cooling unit 3 to thereby enable the lamp cooling unit 3 and cool the lamp 1.

Figure 3:
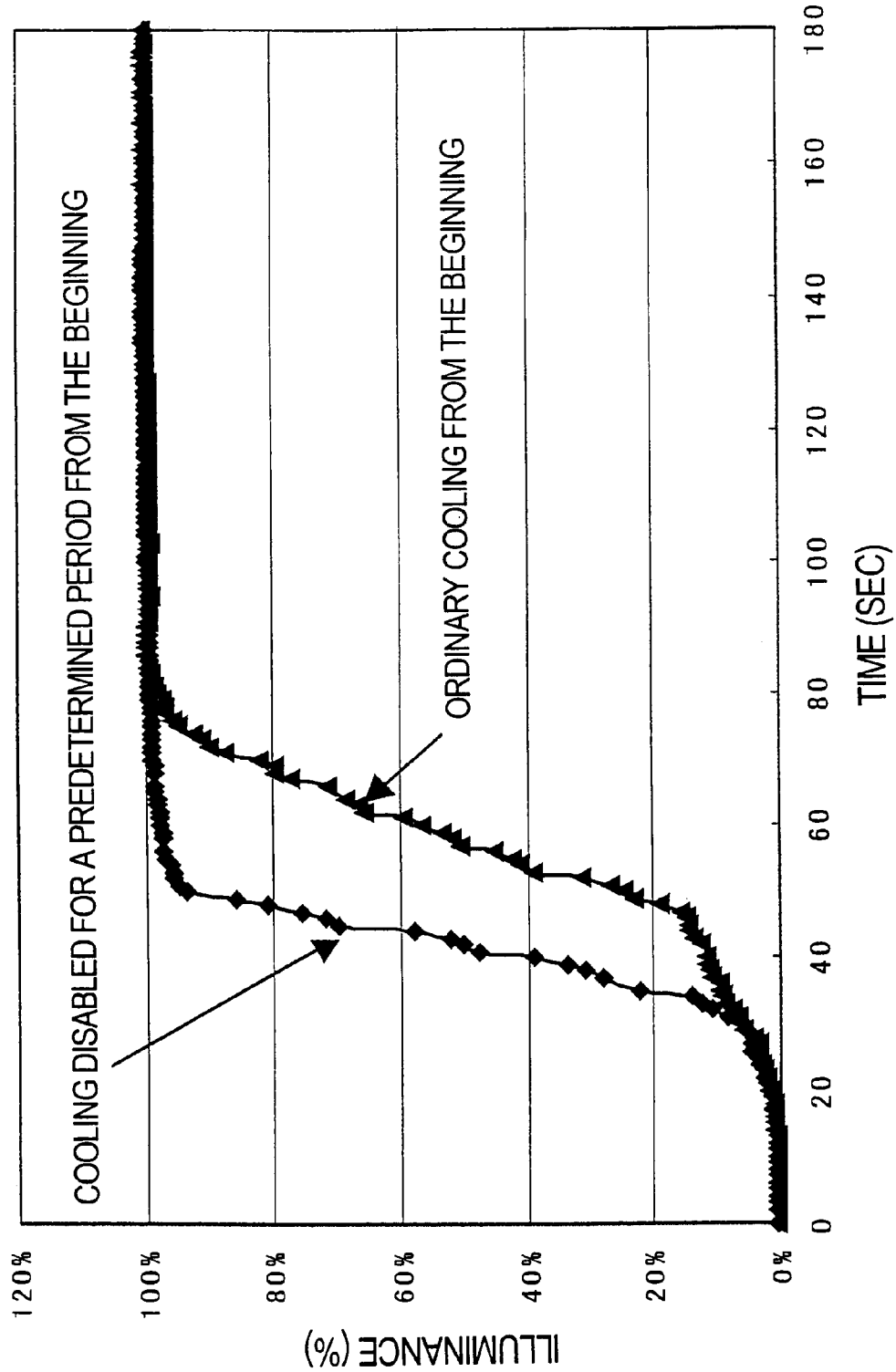
FIG. 3 is a graphical representation of the illuminance characteristic of a lamp started up in accordance with the cooling scheme of the invention, contrasted with a corresponding characteristic of a lamp started up in a conventional cooling scheme.

FIG. 3 is a graph that compares the startup illuminance characteristic of a lamp cooled in accordance with the invention in which the lamp is cooled only after a predetermined time has elapsed from the initiation of a startup, with that of a lamp cooled in a conventional way in which the lamp is cooled from the beginning of a startup. It will be apparent from FIG. 3 that the time required for a lamp to attain full illuminance subsequent to the initiation of a startup is reduced to a greater degree in the inventive cooling scheme (in which the cooling is delayed after the initiation of the startup by a predetermined time) than in the conventional cooling scheme.

As described above, the lamp cooling unit 3 of the invention remains disabled even after the initiation of the startup and until the lamp voltage reaches the rated level (e.g. 40 V), which promotes temperature rise of the lamp 1 and enhances evaporation of the mercury therein, thereby promoting the startup operation of the lamp 1.

Moreover, since the lamp cooling unit 3 is controllably enabled in response to a predetermined change in the lamp voltage of the particular lamp used, the lamp cooling unit 3 can deal with individual variations in the startup rate of lamps to be used. For example, when cooling of the lamp is started after a predetermined period of time has elapsed from the initiation of the startup process, the lamp will have been done with the startup process by the time the cooling is started and has already exceeded its rated temperature if the lamp happens to have a high startup rate, which will result in degradation in the reliability of the lamp. On the other hand, if the lamp has a low startup rate, mercury in the lamp will not have fully evaporated by the time the cooling is started, and the cooling further delays the development of the startup process. In this embodiment, cooling of the lamp can be started at an optimal timing appropriate for the particular lamp used.

It will be appreciated that the lamp drive circuit (lamp ballast) 2 has a function of driving the lamp 1 as well as a function of providing the voltage information on the voltage applied to the lamp 1 (the latter function hereinafter referred to as lamp voltage information output function), so that the object of the invention can be fulfilled at low cost by effective utilization of the lamp drive circuit 2.

Although the lamp voltage information output function of the lamp drive circuit (lamp ballast) 2 is utilized in the preceding embodiment to obtain the result of the invention, substantially the same result can be obtained if the lamp drive circuit has no such function, by means of an additional lamp voltage detection means.

Figure 2:
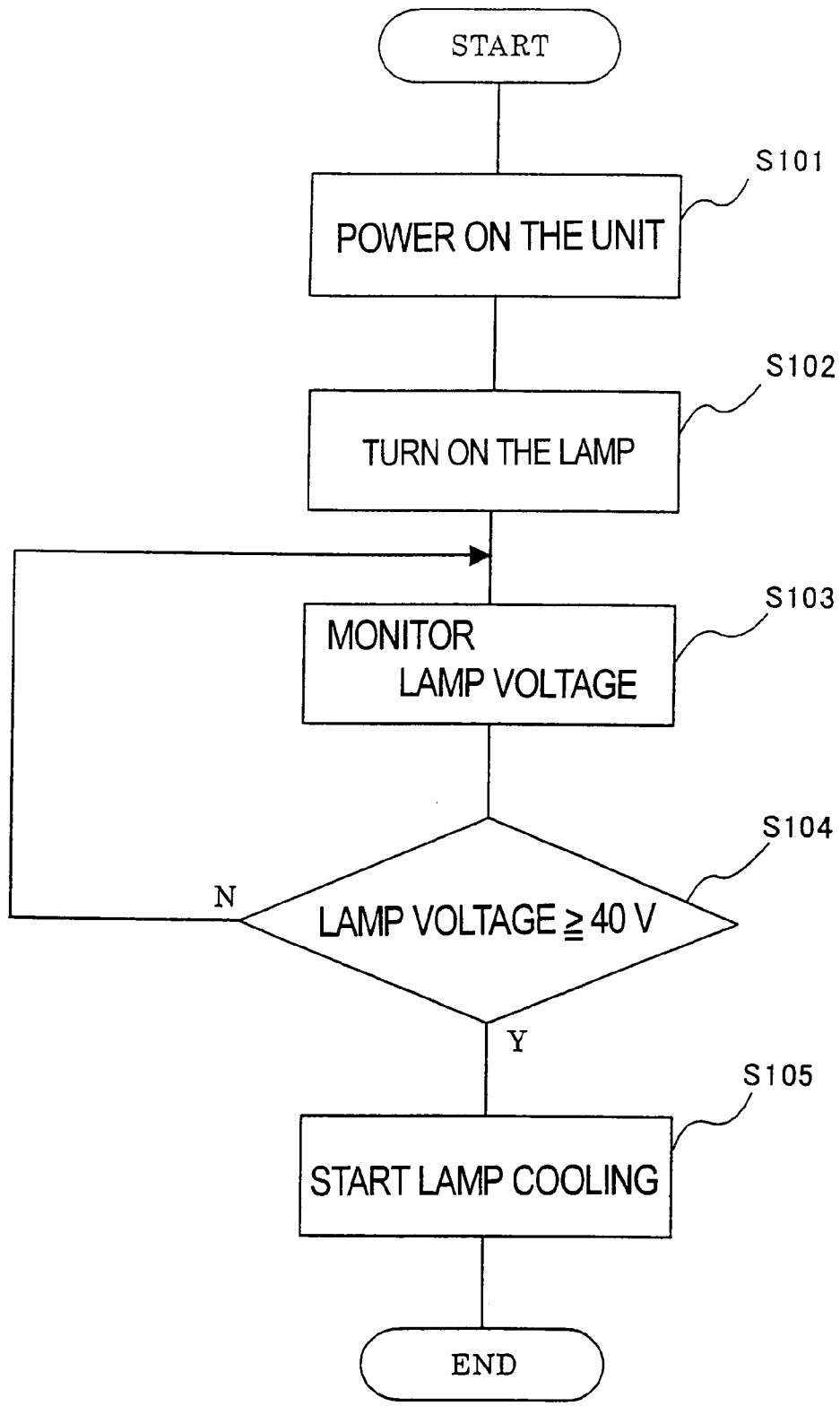
FIG. 2 is a flowchart illustrating operation of the embodiment shown in FIG. 1.

In the procedure shown in the flowchart of FIG. 2 above, a determination is made in step S104 as to whether the lamp voltage has reached 40 V to see if the lamp has been done with the startup process. However, for commonly used ultra-high pressure mercury lamps, this determination can be made at an arbitrary lamp voltage in the range from 20 to 100 V.

Figure 4:
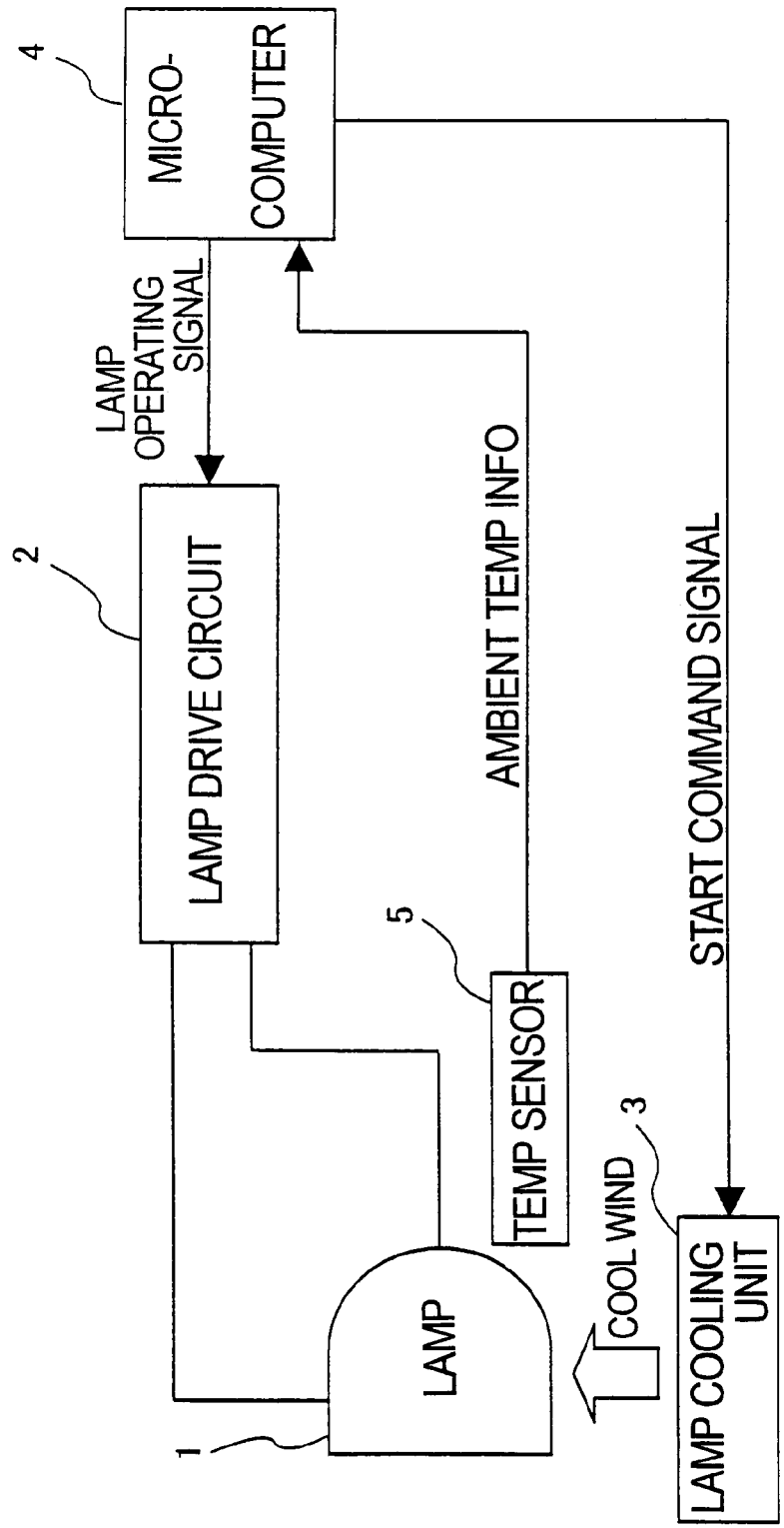
FIG. 4 is a block diagram showing an arrangement of a relevant part of a projection type video display such as a liquid crystal projector in accordance with another embodiment of the invention.

FIG. 4 is a block diagram showing the arrangement of a relevant part of a projection type video display, such as a liquid crystal projector, in accordance with another embodiment of the invention. The same elements in this and the preceding embodiments are designated by the same reference numerals.

This embodiment differs from the preceding embodiment in that a temperature sensor 5 capable of detecting the ambient temperature in the neighborhood of the lamp 1 is used as a means for detecting the startup status of the lamp 1 during a startup operation in the event that the lamp drive circuit (lamp ballast) 2 does not have the lamp voltage information output function. The microcomputer 4, serving as the control means for controlling the lamp cooling unit, is adapted to: output a lamp operating signal to the lamp drive circuit 2; receive information on the ambient temperature (the information referred to as ambient temperature information) from the temperature sensor 5; and output a start command signal to the lamp cooling unit 3 based on the ambient temperature information received. As described above, since the temperature of the lamp 1, and hence the ambient temperature, increases in the course of a startup process, it is possible to reliably detect the startup status of the lamp 1 from the ambient temperature.

As in the preceding embodiment, when the video display is powered on, the microcomputer 4 is turned on and issues a lamp operating signal to the lamp drive circuit 2, thereby turning on the lamp 1. At this point of time, the lamp cooling unit 3 still remains disabled to help the temperature in the lamp 1 rise faster and enhance evaporation of the mercury therein. As the lamp 1 is turned on, the microcomputer 4 starts monitoring the ambient temperature information from the temperature sensor 5, and, when a determination is made that the temperature of the lamp 1 has reached a rated level, outputs a start command signal to the lamp cooling unit 3 to bring the lamp cooling unit into operation.

Referring to the flowchart shown in FIG. 5, operation of the lamp cooling unit 3 will now be described in more detail. As the power is applied to the video display (step S201), the lamp 1 will be turned on by the lamp drive circuit 2 based on the lamp operating signal issued from the microcomputer 4 (Step S202). Then, the ambient temperature is monitored (Step S203) to check if the ambient temperature has reached or exceeded a rated level (70° C.) based on the ambient temperature information from the temperature sensor 5 (Step S204).

The ambient temperature will be continually monitored (looping through Steps S204-S203 defined for the negative answer "N" in the query of Step S204) until the temperature reaches 70° C., without enabling the temperature lamp cooling unit 3. As the ambient temperature becomes equal to or exceeds 70° C., a start command signal is outputted from the microcomputer 4 to the lamp cooling unit 3 to enable the lamp cooling unit 3, thereby starting cooling of the lamp 1.

In this embodiment also, substantially the same startup illuminance characteristic of a lamp subject to the inventive cooling scheme as shown in FIG. 3 can be obtained. In other words, time required for a lamp to reach its full illuminance is reduced to a greater degree by delaying the cooling by a predetermined period of time in accordance with this embodiment than in the conventional cooling scheme.

As described above, in this embodiment the lamp cooling unit 3 is not enabled until the ambient temperature reaches the rated temperature (which is 70° C.) subsequent to the initiation of a startup, so the temperature of the lamp 1 is then prompted to rise faster, thereby enhancing the evaporation of the mercury in the lamp 1, and hence the startup process of the lamp 1.

Moreover, since the lamp cooling unit 3 is enabled in response to a predetermined change in the ambient temperature, it is possible to deal with individual variations in the startup rate of lamps to be used. Without resorting to the present invention, each lamp can undergo a startup process quickly or slowly, depending on the manufacturing variation, so that when the lamp cooling unit 3 is enabled at a predetermined time after the initiation of the startup, the lamp will have been done with the startup process if it has a large startup rate and will have exceeded its rated temperature by that time. This will contribute the lowering in the reliability of the lamp. On the other hand, the lamp will remain cold and the mercury in the lamp will not have evaporated sufficiently by the time the lamp cooling unit 3 is enabled if the lamp has a small startup rate. Then, cooling will further delay the development of the startup process. However, in this embodiment, cooling of the lamp is started at an optimal timing for the particular lamp used.

Figure 5:
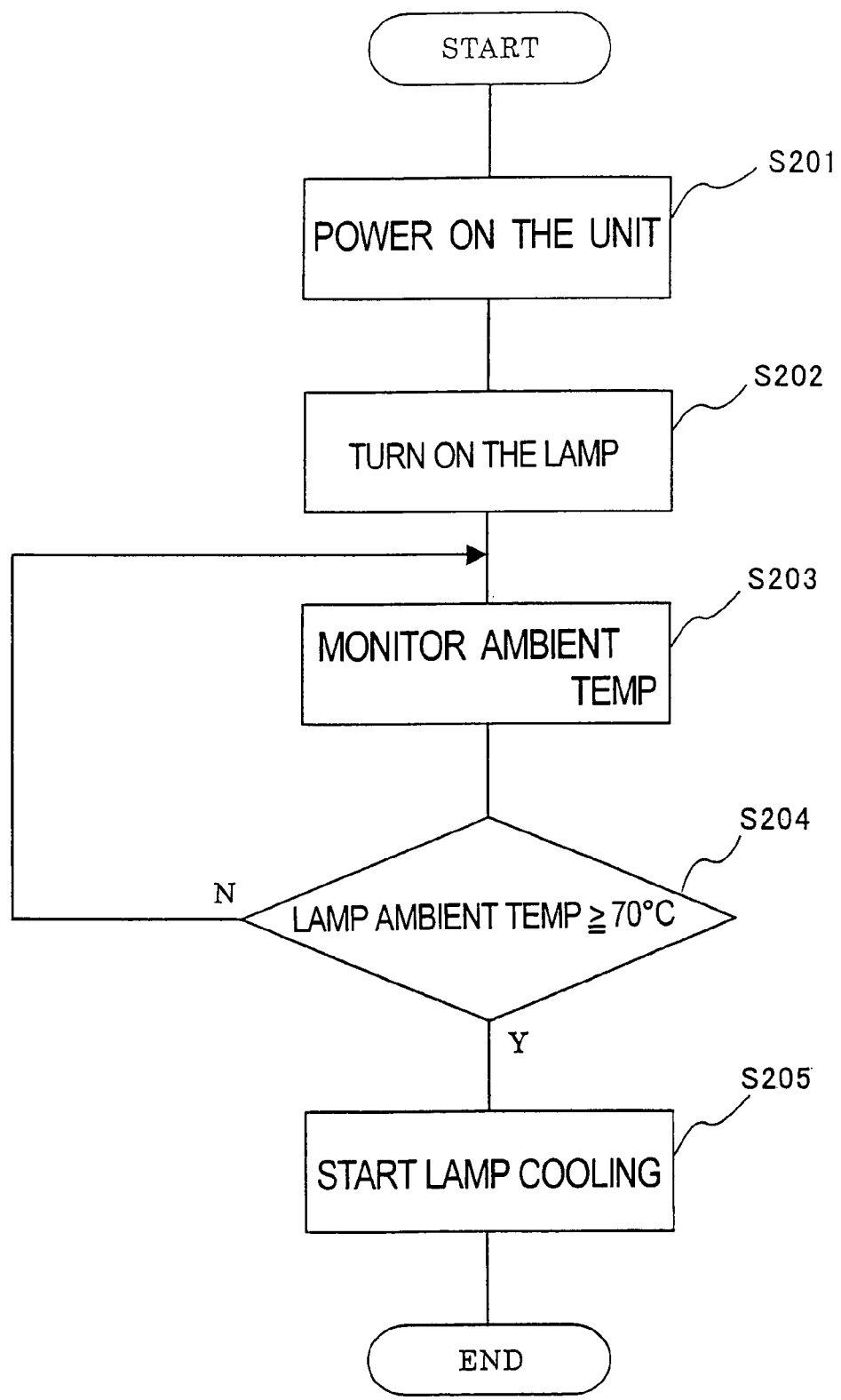
FIG. 5 is a flowchart illustrating operation of the embodiment shown in FIG. 4.

It will be recalled that the determination of the startup status is made at the ambient temperature of 70° C., as shown in the step S204 in the procedure shown in FIG. 5. However, the determination can be made at an arbitrary ambient temperature in the range of 60-180° C. for ordinary ultra-high pressure mercury lamps.

It will be recalled that, in the preceding embodiments, the startup status of a lamp is detected from the lamp voltage information received from the lamp drive circuit (lamp ballast) 2 or from the ambient temperature information received from the temperature sensor 5. However, any means for detecting the startup status can be used alternatively so long as the means can detect a change that represents the development of a startup process of a lamp. For example, an illuminance sensor capable of detecting the illuminance of a lamp based on, for example, the illuminance characteristic of a lamp as shown in FIG. 3, can be used for this purpose.

In each of the preceding embodiments, the lamp cooling unit 3 is not enabled before the lamp voltage or the ambient temperature reaches a rated level. Alternatively, operation of the lamp cooling unit 3 may be controlled in such a way that the volume of the cooling air delivered from the lamp cooling unit 3 to the lamp may be increased in steps or continuously in association with a rise in the lamp voltage or the ambient temperature.

It will be understood that the invention is not limited to a liquid crystal projector utilizing an LCD panel, and can be further applied to those projection type video displays equipped with another type of light generation system for projecting a video. For example, the invention can be applied to a front projection type video display as well as a rear projection type video display. The invention can be also applied to a Digital Light Processing (DLP) projector (registered trade mark of Texas Instruments, Inc.).

The invention claimed is:

1. A projection type video display for displaying a video by projecting light that is emitted from a lamp serving as a light source and modulated on the basis of a video signal, said video display having lamp cooling means for cooling said lamp, said projection type video display, comprising:
    detection means for detecting the startup status of said lamp in a startup operation; and
    control means for controlling said lamp cooling means in accordance with said startup status detected by said detection means, wherein the control means monitors voltage, continues feeding power to the lamp even when the voltage exceeds the prescribed voltage and, at the same time, activates the lamp cooling means when the voltage exceeds the prescribed voltage, and wherein said lamp cooling means remains disabled for a predetermined period from a beginning of said startup operation to until the startup status of said lamp reaches a specified value and wherein said detection means having a function of driving the lamp as well as a function of providing a voltage information on a voltage applied to the lamp and provide the voltage information to the control means so as to ensure said lamp cooling means is not enabled before the voltage reaches said specified value.

2. The projection type video display according to claim 1, wherein said control means is adapted to enable said lamp cooling means when a detection is made by said detection means that a parameter indicative of the startup status of said lamp has reached said specified value.

3. The projection type video display according to claim 1, wherein said detection means is a lamp drive circuit.

* * * * *